United States Patent [19]

Morrison et al.

[11] B 3,928,666

[45] Dec. 23, 1975

[54] GLASS FIBERS COATED WITH A SIZE CONTAINING STARCH ESTERS OF ISOALKANOIC ACIDS

[75] Inventors: Albert R. Morrison, Newark; Harold L. Haynes, Granville; Reuben Hays Bell, Heath, all of Ohio

[73] Assignee: Owens-Corning Fiberglas Corporation, Toledo, Ohio

[22] Filed: Dec. 29, 1972

[21] Appl. No.: 319,414

[44] Published under the Trial Voluntary Protest Program on January 28, 1975 as document no. B 319,414.

[52] U.S. Cl.................. 428/378; 65/3 R; 65/3 C; 106/212; 106/213; 260/233.5; 428/392
[51] Int. Cl.².................. B32B 17/02; C03C 25/02
[58] Field of Search ......... 106/212, 213; 260/233.5; 117/126 GQ; 65/3, 3 R, 3 C; 428/378, 392

[56] References Cited
UNITED STATES PATENTS

| | | | |
|---|---|---|---|
| 3,461,090 | 8/1969 | Haynes | 260/17.4 |
| 3,472,682 | 10/1969 | Rommel | 117/126 GQ |
| 3,481,771 | 12/1969 | Doering | 117/126 GQ |
| 3,513,156 | 5/1970 | Speakman | 260/233.5 |
| 3,615,311 | 10/1971 | Ignatius | 65/3 |
| 3,664,855 | 5/1972 | Morrison | 106/212 |
| 3,720,662 | 3/1973 | Tessler | 260/233.5 |
| 3,746,558 | 7/1973 | Berkhout | 117/126 GQ |

Primary Examiner—William D. Martin
Assistant Examiner—William H. Schmidt
Attorney, Agent, or Firm—Carl G. Staelin; John W. Overman; William P. Hickey

[57] ABSTRACT

A size for lubricating fibers, including glass fibers, which is a water dispersion of a solid unctuous material, as for example a solid wax, fat, or gelled or otherwise solidified oil, and a starch ester of an isoalkanoic acid having from 4 to 6 carbon atoms and/or a substituted alkanoic acid having from 4 to 6 carbon atoms. The wax may be an animal, vegetable, mineral, or synthetic wax which is unctuous and insoluble in water. The oils can be gelled by adding any gelling agent, and preferably a thixotropic gelling agent to the oil. The starch esters are only partially cooked so that unburst starch granules are retained, and this dispersion is intimately mixed with the unctuous solid emulsified particles. Other ingredients such as cationic lubricants, coloring matter, bactericides, waxes having particular characteristics, etc. can be added to provide their separate functions. The combination of the above defined partially burst starch granules of esterified starch, and the emulsified particles of the solid unctuous material have very low migration from coated glass fibers, and when dried, provide low tensions when pulled over guide surfaces.

5 Claims, No Drawings

GLASS FIBERS COATED WITH A SIZE CONTAINING STARCH ESTERS OF ISOALKANOIC ACIDS

BACKGROUND OF THE INVENTION

The above identified application demonstrates a marked improvement over the prior art in size formulation for glass fibers using a combination of starch esters of cyclic hydrocarbons and emulsified solid unctuous materials. It has been found that starch esters of isoalkanoic acids of from 4 to 6 carbon atoms have some of the same advantages as do the best prior art materials and in addition have improved burn off properties.

The principal object of the present invention is the provision of sizing materials for glass fibers which have properties equal to or better than prior art materials, which are less expensive to produce, and which have still further advantages, as for example, greater ease of burn off.

Further objects and advantages will become apparent to those skilled in the art from the following description of numerous preferred embodiments, and methods of preparing same.

DESCRIPTION OF THE PREFERRED EMBODIMENTS

It has been discovered, that starch esters of isoalkanoic acids of from 4 to 6 carbon atoms and substituted isoalkanoic acids of from 4 to 6 carbon atoms will retain emulsified particles of a solid unctuous material such as a wax, a fat, or a gelled oil. These starch esters sufficiently modify the nature of starch as to change it from an "oleophobic" one to a slightly "oleophilic" one to make it compatible with, and have an affinity for, solid predominately hydrocarbon unctuous materials. The isoalkanoic compounds can be attached to the starch through one or more ester linkages. The esterification of the starch can be produced by reaction with acid anhydrides or acid halides. It appears that the smearing nature of the solid unctuous materials is modified by the semi-powdery, dry starch material to provide low tensions when pulled over guide surfaces. On the other hand, the solid particles of unctuous material appear to break up the continuity of the starch coating. The solid nonflowing emulsified particles can be deformed by the starch material on opposite sides thereof when the fibers are flexed without the solid unctuous material flowing to the surface to coat the guide surfaces and thereby cause high tensions. Further, the emulsified particles of solid unctuous material appear to be drawn to and retained about the surface of swollen but unburst starch granules that have had the hydrogen of OH groups of the starch replaced with an ester radical containing an isoalkyl group or radical of 3 to 5 carbon atoms.

EXAMPLE 1

Esterified starch is produced in a nonaqueous media by the following precedure: Pearl corn starch granules (1,000 g) are added with stirring to 1,340 millileters of pyridine and the slurry is kept at room temperature for 1 hour. The reaction temperature is increased to 50°C as iso-butyric anhydride equal to 2 percent to 10.7 percent of the starch solids is added in increments. The reaction mixture is kept at 50°C for 4 hours after the completion of the iso-butyric anhydride addition. The mixture is cooled and filtered. The product is washed with appropriate amounts of 1 percent solution of hydrochloric acid and water.

The dried product is used in preparing an aqueous forming size of the following ingredients:

| | Size | Solids |
|---|---|---|
| Iso-butyric anhydride modified starch (as produced above) | 3.0 % | 52.7% |
| Paraffin Wax (130°F melting point) | 2.0 % | 35.0% |
| Polyoxyethylene sorbitan monostearate (emulsifier) | 0.154% | 2.7% |
| Sorbitan monostearate (emulsifier) | 0.146% | 2.6% |
| Cationic lubricant (reation product of tetraethylene pentamine and stearic acid in a molar ratio of 1:2.0) | 0.200% | 3.5% |
| Montan wax (167 – 175°F congealing point) (50% emulsion) | 0.200% | 3.5% |
| Water | Balance | — |

The paraffin wax is melted and brought to a temperature of 180° to 190°F, the cationic lubricant and emulsifying agents are added thereto, and these materials are thoroughly mixed. Boiling water is then added with violent agitation to form an emulsion. Water is added slowly until the inversion is reached, and an additional amount of water is then added.

The starch is partially cooked in a separate pressure kettle at a 6 percent concentration, by raising the temperature at 3°F per minute until a temperature of 180°F is reached. This takes approximately 90 minutes, following which the starch is quenched to a temperature of 150°F. The hot wax emulsion is then added to the cooked starch and the Montan wax emulsion is added. The remainder of the water is added at 150°F, and the ingredients are thoroughly mixed to complete the size preparation. The starch when thus cooked has 30 percent of the original starch granules remaining at least partially unburst.

The size prepared as above described is supplied to a roll type applicator over which 408 filaments from a forming bushing are pulled to coat the filaments. The filaments have a diameter of approximately 0.0003 inch and are of E glass. The coated filaments are drawn together into a strand, and are coiled into a package that is then dried at room temperature for 24 hours. The package has a migration index of 1.20. The dried strand when uncoiled from the package and twisted into a twisted strand in conventional machinery has a fuzz index of 1.0, the best possible rating. The twisted strand when wound into a quill has a low tension with few broken filaments. The same coated, twisted strand when beamed gives very light beaming fuzz, and the beams when woven into fabric using the quilled strand, produces only very light powdering. The fabric when heat cleaned has a burn-off rating of 1 which is the best possible rating, and exhibits no detectable carbon deposit.

The following examples show that substantially any type of unctuous non-water soluble wax can be used.

EXAMPLE 2

The process of Example 1 is repeated excepting that a hydrogenated oil having a melting point of 96°F is used in place of the paraffin wax having a melting point of 130°F. In this instance, the wax emulsion is prepared at 150°F and the properties of the coated strand equal those of the material of Example 1 in every respect.

EXAMPLE 3

The process of Example 1 is repeated excepting that the wax emulsion used is that of microcrystalline waxes having a melting point of 205°F and the emulsion of which is prepared using boiling water. The strand coated with this material has all of the beneficial properties of that of the material of Example 1, and in addition, has slightly better beaming qualities.

EXAMPLE 4

The process of Example 1 is repeated excepting that the wax emulsion used is a hydrogenated sperm oil wax. This material, likewise, gives coated strand of the same general characteristics as that of Example 1.

Vegetable waxes such as Carnauba, Japan, bayberry, candelilla, and other animal waxes such as bees wax, Chinese wax, etc., can be used. Other mineral waxes such as ozocerite, montan, ceresin, etc. can likewise be used. Some advantages are had in using a combination of ester type wax and paraffin or synthetic waxes such as improved drying characteristics. Synthetic waxes such a polyethylenes, polyethylene glycols, and polyoxyethylene esters, chloronaphthalenes, sorbitols, chlorotrifluoroethylene waxes can be used.

EXAMPLE 5

The process of Example 1 is repeated excepting that propylene gylcol alginate is substituted for the combination of emulsifiers used in Example 1. The coated strand has substantially the same propertries as does the coated strand of Example 1.

EXAMPLE 6

Esterification of the starch is implemented using the same procedures given in Example 1 excepting that 6 percent by weight of isopentanoic anhydride based on the starch solids is used in place of the isobutyric anhydride. The isopentanoic starch ester is then substituted for the starch of Example 1 to produce a forming size. This forming size is applied to glass fibers in the same manner as described in Example 1. The sized fibers have the same improved combination of properties as does the product of Example 1.

EXAMPLE 7

The process of producing starch esters of Example 1 is repeated excepting that 7 percent by weight of isohexanoic anhydride based on starch solids is substituted for the isobutyric anhydride and the material is reacted for 6 hours at 38°C. A forming size is made of the esterified product in the same manner as given in Example 1, and this forming size when applied to glass fibers provides fibers having the same combination of improved properties as does the material of Example 1.

The isoalkanoic ester groups can include other functional groups, so long as these functional groups do not destroy the affinity of the ester for the unctuous materials.

EXAMPLE 8

The process of Example 1 is repeated excepting that iso-butryl chloride (equal to 7 percent of the starch solids) is added dropwise to the starch slurry at room temperature.

The starch so prepared is then used to make a size using the same procedure given in Example 1. The fibers coated therewith have the same combination of improved properties as do the fibers of Example 1.

EXAMPLES 9, 10 AND 11

Aqueous forming sizes were made using the percentages by weight of the following materials:

| Materials | Example 9 | | Example 10 | | Example 11 | |
|---|---|---|---|---|---|---|
| | Size | Solids | Size | Solids | Size | Solids |
| Pearl starch | 3.0 % | 55.0% | — | — | 1.0 % | 38.5 % |
| Starch esterified with isobutyric anhydride | 1.0 | 18.4 | 6.0 | 55.0 | 1.0 | 38.5 |
| Vegetable wax | 0.75 | 14.0 | — | — | — | — |
| Paraffin wax | 0.25 | 4.6 | 4.0 | 35.4 | 0.5 | 19.2 |
| Emulsifying agent (Polyoxyethylene sorbitan monostearate) | 0.14 | 2.6 | 0.2 | 1.9 | 0.025 | .95 |
| Emulsifying agent (Sorbitan monostearate) | 0.12 | 2.2 | 0.2 | 1.9 | 0.025 | .95 |
| Cationic lubricant | 0.175 | 3.2 | 0.3 | 2.8 | 0.05 | 1.9 |

The isobutyric starch ester was that of Example 1. The sizes were prepared by blending the starch materials in approximately one half of the total water. This mixture is heated to 180°F and let stand for one half hour, following which cold water in approximately 1/10 of the total quantity is added to quench the starch. When so cooked, approximately 20 percent or less of the starch granules are burst. The cooking is preferably carried out to produce maximum swelling of the starch granules and has a milky color.

An emulsion of the wax is prepared by heating the wax to a temperature of approximately 180°F. The emulsifying agents are stirred into the molten wax, and thereafter boiling water is slowly poured into the wax mixture with violent agitation to form an emulsion. Water is added slowly until the inversion is reached, and thereafter an additional amount of water is added to provide a stable emulsion. The starch mixture is cooled to a temperature of approximately 150°F and the wax emulsion is then added thereto. The size is then applied to glass fibers at forming as given in Example 1 above. The fibers so produced have substantially the same improved properties as that given in Example 1.

EXAMPLE 12

This example demonstrates that oil thickened to a nonrunny or solid state produces the same general results as does wax. The procedure given in Example 9 was repeated excepting that the vegetable wax emulsion was replaced with 2 percent of a hydrogenated vegetable oil that was thickened with 5 percent of Thixin R based on the oil. Thixin R is a trademark for an organic thixotrope sold by the Baker Castor Oil Company, and is a high melting (Ca 85°C) ester of castor oil. When cooled to room temperature, the vegetable oil and Thixin R mixture forms a self-supporting gel so that the emulsified particles of the mixture are solid and do not flow at room temperature. The glass fibers produced using this size mixture have substantially the same properties as do the fibers produced as given in Example 9 above.

Other suitable gelling agents which can be used are: Attapulgite ($3MgO \cdot 1.5\ Al_2O_3 \cdot 8\ SiO_2 \cdot 9\ H_2O$), Baymal Alumina, a water soluble copolymer of methyl vinyl ether and maleic anhydride, polysaccharide gum (Kelzan made by the Kelco Company), Carbopol (a polycarboxylic acid thixotropic agent manufactured by the B.F. Goodrich Chemical Company per U.S. Pat. No. 2,798,053), a microcrystalline cellulose, Bentonite Clay (Benagua), Guar gum, Methocel (a cellulose gum of: methyl cellulose, hydroxypropylmethylcellulose, and hydroxybutylmethylcellulose), and still others as will occur to those skilled in the art.

In general, aqueous sizes for glass fibers will have the following range of compositions:

| | |
|---|---|
| Starch ester | 0.5–4 |
| Underivatized starch | 0–4 |
| Solid unctuous material (wax, fats, gelled oils) | 0.3–3 |
| Secondary film former | 0–2 |
| Nonionic oil | 0–0.75 |
| Cationic lubricant | 0.05–0.5 |
| Emulsifying agent | 0.05–1.0 |

As previously stated, the starch esters are esters of isoalkanoic acids and substituted isoalkanoic acids of from 4 to 6 carbon atoms wherein some of the OH groups of the starch (0.5% or more) are esterified to give a material of the following general formula:

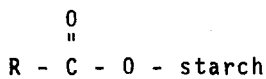

wherein: R is from the group of isoalkyl groups and substituted isoalkyl groups of from 3 to 5 carbon atoms. The substituted groups may contain non-hydrocarbon groups such as amine groups, nitrogen, nitro groups, ketone groups, aldehyde groups, other ester groups, nitrite groups, etc.

The starch diluent can be substantially any other starch film former. The starch diluent may be used to cheapen the product, and such diluents can be used, for example, as a pearl starch, rice starch, any underivatized starch, and/or derivatized starch.

The solid unctuous material can be any wax, fat or gelled oil which does not flow at the temperatures at which the coated strand will be used. According to the invention, and as stated previously, it has been found that the solid unctuous materials do not seep to the surface of the guide eyes over which the strand is drawn, and therefore, do not produce high running tensions as does occur when oils are used.

The secondary film former can be any soft film former commonly used in the art, as for example, gelatine, polyvinyl alcohol, Polyox, acrylates, colloidal animal protein, Renten, etc. Renten is a cationic polymer prepared from 2.5 percent to 10 percent of cationic monomer, and 90 to 97.5 percent of a nonionic monomer. The cationic monomer is a quaternary prepared from diaminoethyl methacrylate and dimethyl sulfate. The nonionic is acrylamide.

The nonionic oils can be vegetable, animal, or mineral oils, and are preferably hydrogenated to reduce their flowability. These materials are used in general to give abrasion resistance to the coated fibers when dry.

The cationic lubricants may be any of the cationic lubricants as is used in the art to serve principally as a lubricant prior to the time that the coated fibers are dried.

The emulsifying agent for the wax can be any suitable emulsifying agent, preferably a nonionic having a HLB between approximately 3 to 16, and the polyoxyalkylenesorbitans are preferred.

In general, the amount of solids in the aqueous sizes that are applied to the glass fibers can be varied from approximately 2 percent to approximately 12 percent, depending upon the amount of material which it is desired to coat the fibers with, and also to some degree, the type of materials which are used. In general, the solids content of the sizes will have the following percentages by weight:

| | |
|---|---|
| Starch ester | 5–90% |
| Underivatized starch | 0–75% |
| Solid unctuous material | 5–40% |
| Secondary film formers | 0–5% |
| Nonionic oils | 0–5% |
| Cationic lubricants | 1–7% |
| Emulsifying agents | 0.5–7% |

Good materials can be made using the following materials in percent by weight of solids: from 10–70 percent underivatized starch; 5–75 percent starch ester; and 10–40 percent of unctuous material. Sizes therefrom may contain from 3.5 to 7.5 percent solids. These sizes will have the following materials in percent by weight: underivatized starch 1 to 4 percent; starch esters 0.5 to 4.5 percent; wax 0.8 to 2 percent, and cationic lubricant 1.0 to 4.0 percent.

The dried residue that is formed on the fibers will have substantially the same composition as the percent solids by weight given above, excepting that the cationic lubricants and to a lesser extent the nonionic oil, may be lower due to migration.

The coating that is left on the fibers will comprise unburst starch granules coated with small emulsified particles of the solid unctuous material, and any nonionic oils present. These coated granules will be cemented together loosely by the starch material from the granules which have been burst, as well as any secondary film formers present. The starch material from the burst granules will hereafter be called solubilized starch, and the solubilized starch when dried around the coated granules produces a powdery surface thereon that is also attracted to the starch esters to prevent the solid unctuous material from smearing onto the guide surfaces. The solubilized starch and secondary film former are, in a sense, a soft cementing material which surrounds and holds the unburst starch granules coated with the emulsified particles of solid unctuous material together, so that when the coated fibers are bent, the soft nonrunny unctuous material is defomed to take up the foreshortening which occurs by reason of the flexing action. The soft cementing material (solubilized starch and secondary film former) is thereby prevented from being flaked off of the surface of the glass fibers. Any emulsified nonionic oil particles present can, of course, seep to the surface to increase the tension, as desired, and to the extent that the nonionic oil is present. The cationic lubricant is, of course, water soluble and is attracted to glass and metal surfaces, so that the cationic lubricant insures a lubricating effect even though the water should be displaced by pressure over the guide surfaces.

Although a cooperation of the starch esters of the invention with the wax particles is had when the starch ester granules are burst or dispersed, the preferred materials of the invention will preferably have at least 20% of the starch ester granules swollen but unburst. The best materials have 50% or more of the starch ester present in the form of unburst starch granules, with the most preferred materials having approximately 80% or more of the starch ester granules in the unburst condition.

While the invention has been described in considerable detail, we do not wish to be limited to the particular embodiments shown and described, and it is our intention to cover hereby all novel adaptations, modifications, and arrangements thereof which come within the practice of those skilled in the art to which the invention relates.

We claim:

1. Glass fibers having an aqueous coating thereon consisting essentially of solubilized starch; unctuous material from the group consisting of vegetable waxes, animal waxes, mineral waxes, synthetic waxes, fats and gelled oils; and an effective amount of swollen but unburst starch granules modified by esters of an isoalkanoic acid of from 4 to 6 carbon atoms inclusive, to retain said unctuous material as a lubricant.

2. The glass fibers of claim 1 wherein said acid is isobutyric acid.

3. The glass fibers of claim 1 wherein said acid is isopentanoic acid.

4. The glass fibers of claim 1 wherein said acid is isohexanoic acid.

5. Glass fibers having a coating thereon consisting essentially of the following solids in percent by weight:

| | |
|---|---|
| Esterified starch having ester groups of the formula $$R-\overset{\overset{O}{\|}}{C}-O-starch$$ wherein R is an isoalkyl group of from 3 to 5 carbon atoms | 5-90% |
| Underivatized starch | 0-75% |
| Solid unctuous material | 5-40% |
| Secondary film formers | 0-5% |
| Nonionic oils | 0-5% |
| Cationic lubricants | 1-7% |
| Emulsifying agents | 0.5-7% | an effective amount of said esterified starch being present as swollen and unburst starch granules to restrict migration of the unctuous material through the fibers.

* * * * *